UNITED STATES PATENT OFFICE.

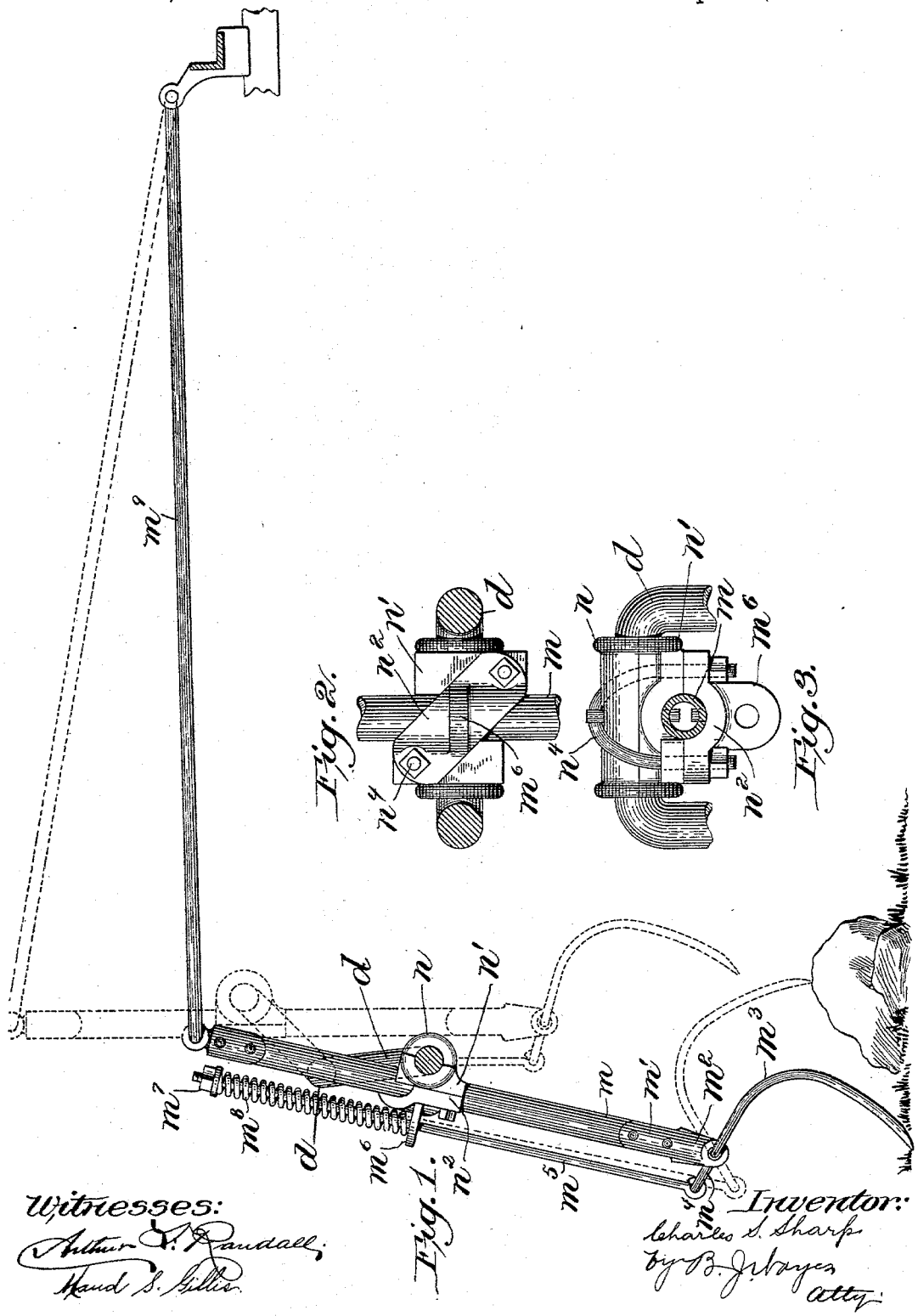

CHARLES S. SHARP, OF AUBURN, NEW YORK, ASSIGNOR TO THE D. M. OSBORNE & COMPANY, OF SAME PLACE.

HAY-TEDDER.

SPECIFICATION forming part of Letters Patent No. 589,796, dated September 7, 1897.

Application filed September 22, 1893. Serial No. 486,220. (No model.)

*To all whom it may concern:*

Be it known that I, CHARLES S. SHARP, of Auburn, county of Cayuga, State of New York, have invented an Improvement in Hay-Tedders, of which the following description, in connection with the accompanying drawings, is a specification, like letters on the drawings representing like parts.

Prior to this invention hay-tedders have been provided with many different forms or constructions of tedder-forks which have been connected with their fork-arms in such a manner as to yield more or less or turn on their pivots when passing over obstacles which lie in their path; but, so far as I am aware, the tines of the forks have always terminated at that side of the fork-arm toward the rear of the machine. In some cases the crank-shaft and links have been so proportioned that the downward thrust of the fork-arm as the machine advances is more nearly in alinement with said arm than in other cases, and when the parts are so proportioned should the points of the tines of the fork strike an obstacle during such downward thrust of the fork-arm said tines will be bent or broken. It is very desirable to so arrange and proportion the crank-shaft and links that the downward thrust of the fork-arm shall be in alinement with said arm, or nearly so, in order that the forks may better enter an accumulation of hay and quickly throw it, yet not scatter it unnecessarily.

This invention relates to tedder-forks operated by a crank-shaft and links which are so arranged and proportioned that the downward thrust of the fork-arms shall be approximately in alinement with said arm, and has for its object to so construct and arrange the fork that should the points of its tines strike a stone or other object during the downward thrust of the fork-arm said fork will be turned on its pivot in a direction toward the front of the machine and its tines be uninjured.

In carrying out this invention the fork is pivoted to the lower end of a fork-arm, and the tines of the pivoted fork are bent more or less and project toward the front of the machine, and the points of said tines terminate at that side of the fork-arm toward the front of the machine. The bend which may be given to the tines may be more or less, but I prefer to bend them right-angularly, so that the lower part or portion of the tines will occupy a position more or less oblique to the ground, in order that they may always be properly presented and operated to lift the hay and not scratch or dig up the roots.

Figure 1 shows in side elevation a tedder-fork embodying this invention, together with its crank and link. Figs. 2 and 3 show details of a clamp by means of which the fork-arm is attached to the crank-shaft.

The tedder-fork consists of a tubular rod or bar $m$, having secured to opposite sides of its lower end two clips $m'$, provided with downwardly-projecting ears $m^2$, which serve as bearings for the fork.

The rod, bar, or arm $m$ is embraced at a point midway between its ends by a clamp, which is loosely mounted upon the usual cranked tedder-shaft $d$, said clamp being herein shown as composed of two parts $n\ n'$, which loosely embrace the tedder-shaft $d$, and a diagonally-arranged cross-piece $n^2$, which is placed upon or against the part $n'$, said parts $n'$ and $n^2$ having transverse recesses upon their adjacent sides or faces which receive and snugly embrace the arm $m$.

At the bottoms of the transverse recesses in the parts $n'\ n^2$ teats are herein formed which enter holes in the arm $m$. A strap $n^4$ passes around the parts $n\ n'$, the ends of which pass through holes in the diagonal cross-piece $n^2$ and are supplied with nuts, thereby serving as a means of securing the parts together.

The fork $m^3$ is supported by its crown in the ears $m^2\ m^2$ at the lower end of the arm $m$, and at the middle of said crown, between said ears, a loop $m^4$ is formed which projects toward the rear of the machine, (which direction is commonly referred to in tedder-forks as "toward the front of the fork,") and said loop $m^4$ is connected to the lower end of a rod $m^5$, which extends upwardly substantially parallel with the fork-arm $m$, and passes through an ear $m^6$, projecting from the part $n^2$ of the clamp.

A nut $m^7$ is screwed onto the upper end of said rod $m^5$, and a spiral spring $m^8$ encircles said rod, the lower end of which bears against the ear $m^6$, while the upper end bears against the nut $m^7$, the tendency of said spring being to hold the rod $m^5$ in a predetermined elevated position, yet free to yield when said rod is drawn down. The loop $m^4$, striking the lower edges of the clips $m'$, or, it may be, the lower end of the arm $m$, limits the upward movement of the rod.

The tines of the fork are each bent at right angles, or nearly so, between their pivotal connections and points and project in a direction toward the front of the machine, and said tines terminate at that side of said fork-arm. By thus terminating the tines of the pivoted fork at that side of the fork-arm toward the front of the machine it will be understood that should the tines strike a stone or other elevated obstruction during the downward thrust of the fork-arm the fork will be turned on its pivot in a direction toward the front of the machine, as well as at all other times during its operation. By thus bending the tines of the fork right-angularly it will be seen that the lower parts or portions of the tines below the bends will occupy an oblique position to the ground, and the action upon the hay is to lift it from the ground and not scratch the soil or dig up the roots or needlessly scatter the hay.

The upper ends of the arms $m$ of the tedder-forks are loosely connected by rods, links, or bars $m^9$ to fixed points, and said links are made of such a length, and they are connected to the upper ends of the arms at such a distance from the crank, and said cranks are so constructed and arranged, that the downward thrust given to the fork-arm is approximately in alinement with said arm, thereby securing the ends sought to be attained in the tedder.

I claim—

1. In a tedder, the combination of a fork-arm, a crank-shaft and link for operating it constructed and arranged to give to said fork-arm a downward thrust approximately in alinement with the arm, a fork pivotally connected to the lower end of said arm having bent tines which extend from said arm toward the front of the machine and terminate at that side of said arm, whereby it is adapted to turn on its pivot in a direction toward the front of the machine when the points thereof encounter an obstacle during the downward thrust of the fork-arm, as well as at all times while performing its work, substantially as described.

2. In a tedder, the fork-arm $m$ provided with an eye at its upper end to receive the link, and, having metallic clips $m'$ at its lower end provided with ears $m^2$ in line with the arm, a fork pivotally supported in said ears having a loop $m^4$ projecting from the crown thereof between said ears at one side of said arm in a direction toward the rear of the machine, and having its tines bent and extended from said arm at the opposite side thereof in a direction toward the front of the machine, and terminated at that side of said arm, a rod $m^5$ connected with said loop $m^4$, and located beside and parallel with said arm $m$, a guide-loop $m^6$ for the upper end of said rod, a spring $m^8$ encircling said rod and arranged to draw said rod upward, and a clamp securing the fork-arm to the crank-shaft from which said guide-loop $m^6$ projects, substantially as described.

3. A tedder-fork pivotally connected to a fork-arm having bent tines which project toward the front of the machine, and terminate at that side of said fork-arm, substantially as described.

4. A tedder-fork pivotally connected to a fork-arm having right-angularly-bent tines which project toward the front of the machine, and terminate at that side of said fork-arm, substantially as described.

In testimony whereof I have signed my name to this specification in the presence of two subscribing witnesses.

CHARLES S. SHARP.

Witnesses:
W. H. HARRIS,
GEO. E. CRONKRIGHT.